(12) United States Patent
Frigeri

(10) Patent No.: US 7,322,282 B2
(45) Date of Patent: Jan. 29, 2008

(54) ASSEMBLY FOR CREATING MILK FROTH AND/OR FOR HEATING MILK

(75) Inventor: Patrizio Frigeri, Uster (CH)

(73) Assignee: Saeco IPR Limited (IE)

(*) Notice: Subject to any disclaimer, the term of this patent is extended or adjusted under 35 U.S.C. 154(b) by 0 days.

(21) Appl. No.: 11/345,508

(22) Filed: Feb. 1, 2006

(65) Prior Publication Data

US 2006/0174772 A1    Aug. 10, 2006

(30) Foreign Application Priority Data

Feb. 8, 2005    (CH)    ................................. 0193/05

(51) Int. Cl.
*A47J 31/00*    (2006.01)
(52) U.S. Cl. .............. 99/453; 99/290; 99/293; 99/300
(58) Field of Classification Search .......... 99/279–314, 99/323, 323.1, 323.3, 452–455; 261/72.1, 261/66
See application file for complete search history.

(56) References Cited

U.S. PATENT DOCUMENTS

| 4,949,631 | A | * | 8/1990 | Fregnan | 99/452 |
| 4,960,042 | A | * | 10/1990 | Grossi | 99/293 |
| 5,473,972 | A | | 12/1995 | Rizzuto et al. | |
| 5,738,002 | A | * | 4/1998 | Marano-Ducarne | 99/293 |
| 6,006,654 | A | * | 12/1999 | Pugh | 99/293 |
| 6,499,389 | B1 | * | 12/2002 | Probst | 99/323.1 |
| 6,561,079 | B1 | * | 5/2003 | Muller et al. | 99/282 |
| 6,713,110 | B2 | * | 3/2004 | Imboden et al. | 426/511 |
| 7,021,206 | B2 | * | 4/2006 | Eckenhausen et al. | 99/452 |
| 2004/0029834 | A1 | | 2/2004 | Schiestel et al. | |

FOREIGN PATENT DOCUMENTS

DE    42 13 895    11/1992
EP    09 04 719    3/1999

* cited by examiner

*Primary Examiner*—Timothy F. Simone
(74) *Attorney, Agent, or Firm*—Maginot, Moore & Beck

(57) ABSTRACT

An assembly for creating milk froth and/or for heating milk is disclosed. It comprises a foaming device and optionally a milk container and a valve assembly. The foaming device is provided with a steam supply channel, an air supply channel, a milk supply channel and a discharge opening. In order to provide for an easy cleaning of the assembly and its microbicity, at least the components and/or cavities coming into contact with milk are provided with a hydrophobic and oleophobic surface consisting of nano-particles which consist partially of silver or a silver compounds.

14 Claims, 2 Drawing Sheets

ASSEMBLY FOR CREATING MILK FROTH AND/OR FOR HEATING MILK

BACKGROUND OF THE INVENTION

The present invention refers to an assembly for creating milk froth and/or for heating milk, comprising a foaming device including a steam supply channel, an air supply channel, a milk supply channel, and a discharge opening. For the sake of simplicity, such assemblies are called hereafter also as "frothers" or "milk frothers".

For creating milk froth, so-called milk foaming devices or emulsifying devices are known in various embodiments. Usually, these milk foaming devices or emulsifying devices comprise a steam supply channel, opening into a suction chamber. The suction chamber communicates with a milk supply channel and an air supply channel. By means of the steam flow, a negative pressure is created in the suction chamber, said negative pressure causes milk to flow via the milk supply channel into the suction chamber and air to flow via the air supply channel into the suction chamber. The so created mixture of steam, air and milk is brought into a turbulent flow in a subsequent emulsifying chamber, with the result that a homogenous milk froth is created. The milk froth created by such a foaming device can be used, for example, for preparing a Cappuccino beverage or a "Latte Macchiato" beverage. Besides creating milk froth, such a foaming device usually can also be used to heat milk, whereby in such a case the supply of air is interrupted.

PRIOR ART

The publication EP 0,195,750 A1 discloses an emulsifier unit particularly for emulsifying steam and milk. The emulsifier comprises a nozzle body member, connected to a steam generator. The nozzle body member is inserted into a tubular body member, opening tangentially into a cylindrical emulsifying chamber. The latter one comprises, at its bottom, a discharge opening. In the interior of the tubular body member, a suction chamber is created into which opens, at its top, an air supply inlet and, at its bottom, a milk supply inlet. Upon feeding steam into the suction chamber, a negative pressure is created therein, causing the aspiration of milk and air. The mixture of water, steam, air and milk is tangentially fed into the emulsifying chamber in which it is brought into a turbulent flow, which supports the emulsifying process and causes the steam to condensate. The so created emulsion leaves the device through the discharge opening.

A disadvantage of such an assembly may be seen in the fact that it is quickly contaminated, that it is not microbicidal, and that the milk residues remaining in the foaming device after each foaming operation are subject to the influence of bacteriae, leading to a serious health risk. In order to avoid that risk, the assembly has to be thoroughly cleaned after each foaming operation.

The publication U.S. Pat. No. 4,949,631 A describes a device for frothing milk, in which an injector is provided with a nonstick material on its external surface, while an inner cylindrical nozzle and a nozzle with a flow guide are "tefloned" both on the internal and external surface. Said nonstick material may also be Teflon®.

A disadvantage of such a milk frother may be seen in the fact that it is complicated, complex and therefore expensive to apply Teflon® coatings on non-planar surfaces. Moreover, Teflon® coatings are not microbicidal.

Finally, the publication US 2004/0029834 A1 discloses microbicidally coated articles, especially containers, having on at least part of it a coating comprising an organically modified inorganic matrix comprising silver colloids. This coating may be applied by applying a composition comprising (a) defined silane derivatives, and (b) a silver compound onto the surface, and thereafter forming the silver colloid by heat and/or radiation.

A disadvantage of such a milk frother may be seen in the fact that the application of such microbicidal coatings is complicated, complex and therefore expensive. Moreover, silane derivatives are hydrophobic but they are not oleophobic, so that a thorough cleansing of the device after each foaming operation is still compulsory.

OBJECTS OF THE INVENTION

It is an object of the present invention to provide an assembly for creating milk froth and/or for heating milk that is less subject to contamination and that is easier to clean.

SUMMARY OF THE INVENTION

To meet this and other objects, the invention provides an assembly for creating milk froth and/or for heating milk, comprising a foaming device including a steam supply channel, an air supply channel, a milk supply channel, and a discharge opening, in which:

(a) at least a part of the components and/or cavities coming into contact with milk are provided with a surface which is both hydrophobic and oleophobic provided by nano-particles;

(b) said nano-particles partially consist of silver or silver compounds; and (c) said steam supply channel discharges via a nozzle into said milk supply channel of said and said assembly, and said milk supply channel discharges into a mixing channel, whereby said nozzle, said milk supply channel, said discharge opening and said mixing channel are provided with said surface provided by said nano-particles.

The expression "nano-particle" shall describe particles with a dimension between $10^{-10}$ and $10^{-7}$ m, preferably $10^{-8}$ m.

In this way, the danger of physical contamination can be drastically reduced. Moreover, such surfaces are easier to clean. Since said nano-particles partially consist of silver or silver compounds they provide a lasting microbicity of the treated surfaces.

BRIEF DESCRIPTION OF THE DRAWINGS

In the following, an embodiment of the assembly according to the invention will be further described, with reference to the accompanying drawings, in which.

DETAILED DESCRIPTION OF A PREFERRED EMBODIMENT

Figure 1:
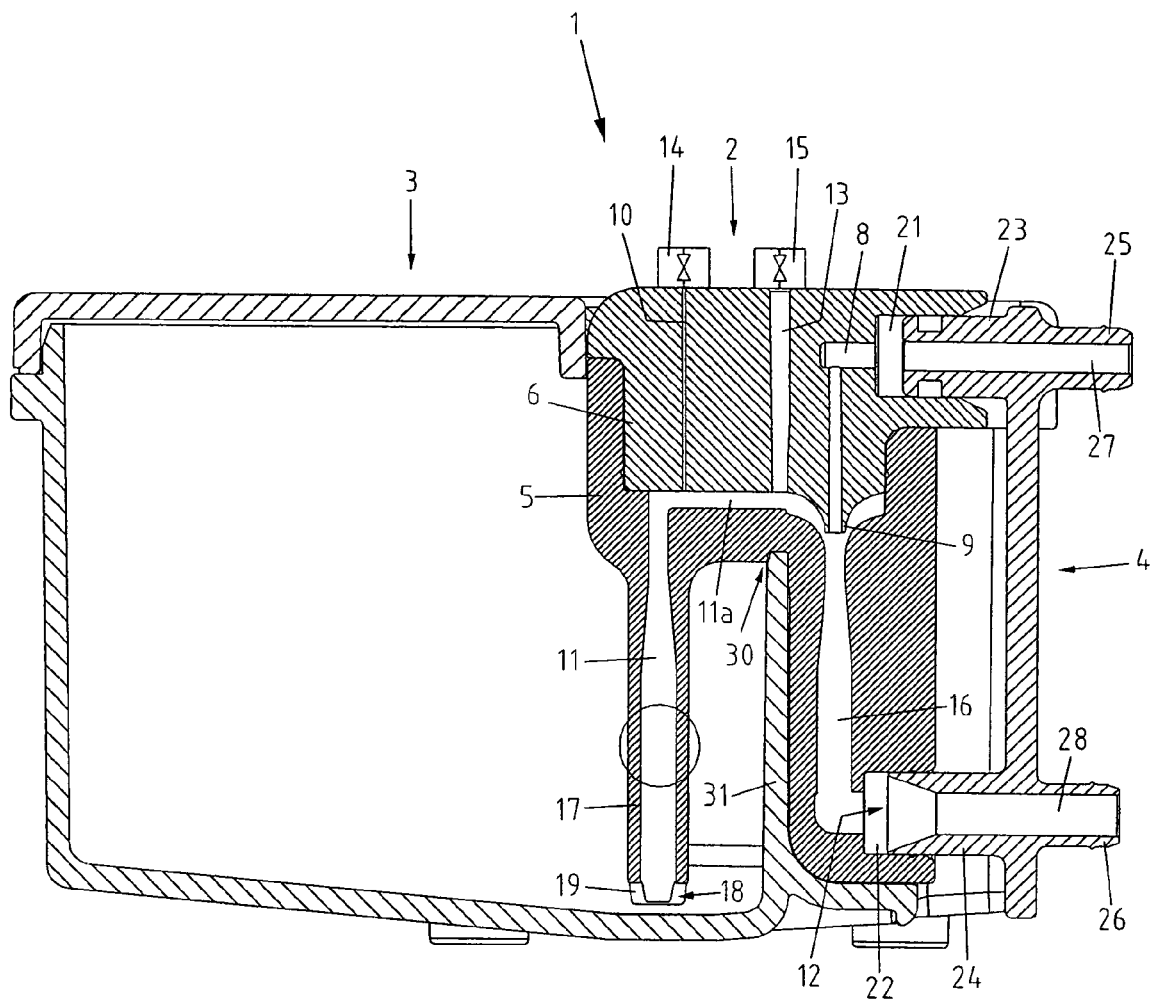
FIG. 1 shows a longitudinal sectional view of the assembly for creating milk froth and/or for heating milk.

The assembly for creating milk froth and for heating milk is designated, as a whole, by reference numeral 1. Essentially, the assembly 1 comprises a foaming device 2, a milk container 3, and a coupling element 4. The foaming device 2 comprises a lower portion 5 and an upper portion 6, attached to each other by means of a push-fit connection. The lower portion 5 is sealingly attached to the upper portion 6, whereby the required sealing gaskets are not shown in this view of the drawing. The foaming device 2 comprises a steam supply channel 8, an air supply channel 10, a milk supply channel 11, a discharge opening 12 as well as a venting channel 13. The horizontally extending portion of the milk supply channel 11 is designated by reference numeral 11a. The end of the steam supply channel 8 is designed as a nozzle 9.

Both the air supply channel 10 and the venting channel 13 each are provided with a valve member 14, 15 by means of which the channels 10, 13 can be selectively closed and opened to communicate with the ambient air, respectively.

The foaming device 2 is further provided with a trunk-shaped appendage 17, extending towards the bottom of the milk container 3. It contains the milk supply channel 11, and the distal end thereof has an inlet opening 18 communicating with the milk supply channel 11. The appendage 17 is provided, in the region of its inlet opening 18, with two diametrically opposite, radially extending cutouts 19, which favor the entry of milk from the milk container 3 into the appendage 17. At the inlet of the steam supply channel 8, a cylindrical recess 21 is provided in the foaming device 2. The outlet opening 12 opens into a cylindrical recess 22, too.

The coupling element 4 is provided with two cylindrical stubs 23, 24, the distance between the two stubs 23, 24 corresponding to the distance between the two cylindrical recesses 21, 22, and the outer diameter thereof matching the diameter of the two cylindrical recesses 21, 22 to enable a leak proof plug and socket connection between the particular stub 23 and 24, respectively, and the particular recesses 21 and 22, respectively. The two cylindrical stubs 23, 24 communicate in each case via a bore 27 and 28, respectively, with a connecting flange 25 and 26, respectively. Thereby, the upper connecting flange 25 is adapted to receive a hose (not shown) running to a steam source (not shown), while the lower connecting flange 26 is adapted to receive a hose (not shown) running to a beverage outlet (not shown).

The foaming device 2 is provided with a groove 30 to clampingly attach the foaming device 2 to a wall portion 31, provided with a cutout, of the milk container 3. In order to remove the foaming device 2 from the milk container 3, first the coupling element 4 is removed by laterally pulling it off. Thereafter, the foaming device 2 can be lifted upwards off the milk container 3.

In order to reduce the danger of contamination particularly of those parts and cavities of the foaming device 2 coming into contact with milk, the steam supply channel 8, the air supply channel 10, the milk supply channel 11, 11a, the discharge opening 12, the venting channel 13 as well as the nozzle 9 are provided with a hydrophobic and oleophobic layer constituted by nano-particles. Preferably, at least a portion of the nano-particles consists of silver or a silver compound. Also a netting of the layer and/or the injection of silver ions into the layer is possible. Silver has the fundamental advantage that it shows microbicidal properties and effects a slow-down of growth of germs and bacteriae and kills them, respectively. Particularly with regard to the desired hygienic properties of the assembly, this is of vital importance for all the components and surfaces of the foaming device 2 that come into contact with milk. Such a nano-disperse layer is designed such as to provide a very large surface such that the silver can develop its above mentioned properties in an optimal way. Preferably, also the milk container 3, the coupling element 4 as well as the hose (not shown) running from the coupling element 4 to the beverage outlet (not shown) are provided with such a layer constituted by nano-particles. The layer is applied preferably by flooding the channels to be coated or by immersing the elements to be coated into a corresponding bath.

Since the general operating mode of such an assembly is well known in the art, the two modes of operation of the assembly according to the present embodiment will be explained only briefly.

In order to produce foamed milk, the valve member 14 located at the inlet of the air supply channel 10 is opened, while the valve member 15 located at the inlet of the venting channel 13 is closed. Now, steam is supplied via the steam supply channel 8. The steam enters the mixing channel 16 through the nozzle 9 and creates a negative pressure in the region of the nozzle 9. The negative pressure has two effects: First, milk is sucked into the milk supply channel 11 via the appendage 17, and second, air flows via the air supply channel 10 into the horizontally extending portion 11a of the milk supply channel 11. The air flowing in through the air supply channel 10 is mixed with the milk flowing through the portion 11a of the channel 11. Downstream the nozzle 9, the milk mixes with the steam which thereby condensates almost immediately. By that condensation reaction, the suction effect in the region of the nozzle 9 is even boosted. The mixture of air, milk, steam and water, respectively, flows into the mixing channel 16 in which a homogenous milk froth is created, escaping from the foaming device 2 through the discharge opening 12 and flowing, through the bore 28 in the cylindrical stub 24 of the coupling element 4, into the connecting flange 26. Therefrom, it can flow to the beverage outlet via not shown duct means.

For warming or heating milk, both the valve member 14 located at the inlet of the air supply channel 10 and the valve member 15 located at the inlet of the venting channel 13 are closed. Thereafter, again via the steam supply channel 8, steam is supplied, flowing through the nozzle 9 into the mixing channel 16. The negative pressure zone in the region of the nozzle 9, generated by the flowing steam, results in sucking in milk into the milk supply channel 11 via the appendage 17; however, air is prevented to flow into the horizontally extending portion 11a of the milk supply channel 11. In this way, milk can be heated quickly and easily.

In order to ensure that the milk-containing duct portions, bores and channels 11, 11a, 12, 16, 28 are drained after a foaming or heating cycle, the valve member 15 located at the inlet of the venting channel 13 is opened after each operation cycle.

Even if the assembly is relatively unsusceptible to contamination, it should be cleaned regularly. This can be performed either by means of a flushing program in which at least the ducts, bores and channels 11, 11a, 12, 16, 28, which are critical as far as contamination is concerned, are flushed with hot water. Or, another possibility consists in manually removing the coupling element 4 from the foaming device 2 and to lift the foaming device 2 off the milk container 3. Thereafter, the upper portion 6 of the foaming device 2 can be pulled off the lower portion 5 with the result that the inner parts of the foaming device, which are critical as far as contamination is concerned, particularly the horizontally extending portion 11a of the milk supply channel 11 as well as the nozzle 9 are exposed. The afore mentioned parts and elements then can be cleaned in a dish washer.

Since all channels of the foaming device 2 are provided with a hydrophobic and oleophobic surface layer constituted by nano-particles, it is hardly possible that any grime or grunge can accumulate therein or milk residues remain therein. Anyway, the components constituting the assembly 1, particularly the foaming device 2, the milk container 3 as well as the coupling element 4, can be cleaned very easily. It is to be noted that the components critical with regard to contamination, particularly the interior of the milk container 3, the milk supply channel 11, 11a, and the mixing channel 16 of the foaming device 2, as well as the bore 28 running through the coupling element 4, all are easy to clean since hardly any milk residues can accumulate in these channels, ducts, cavities and bores.

Figure 2:
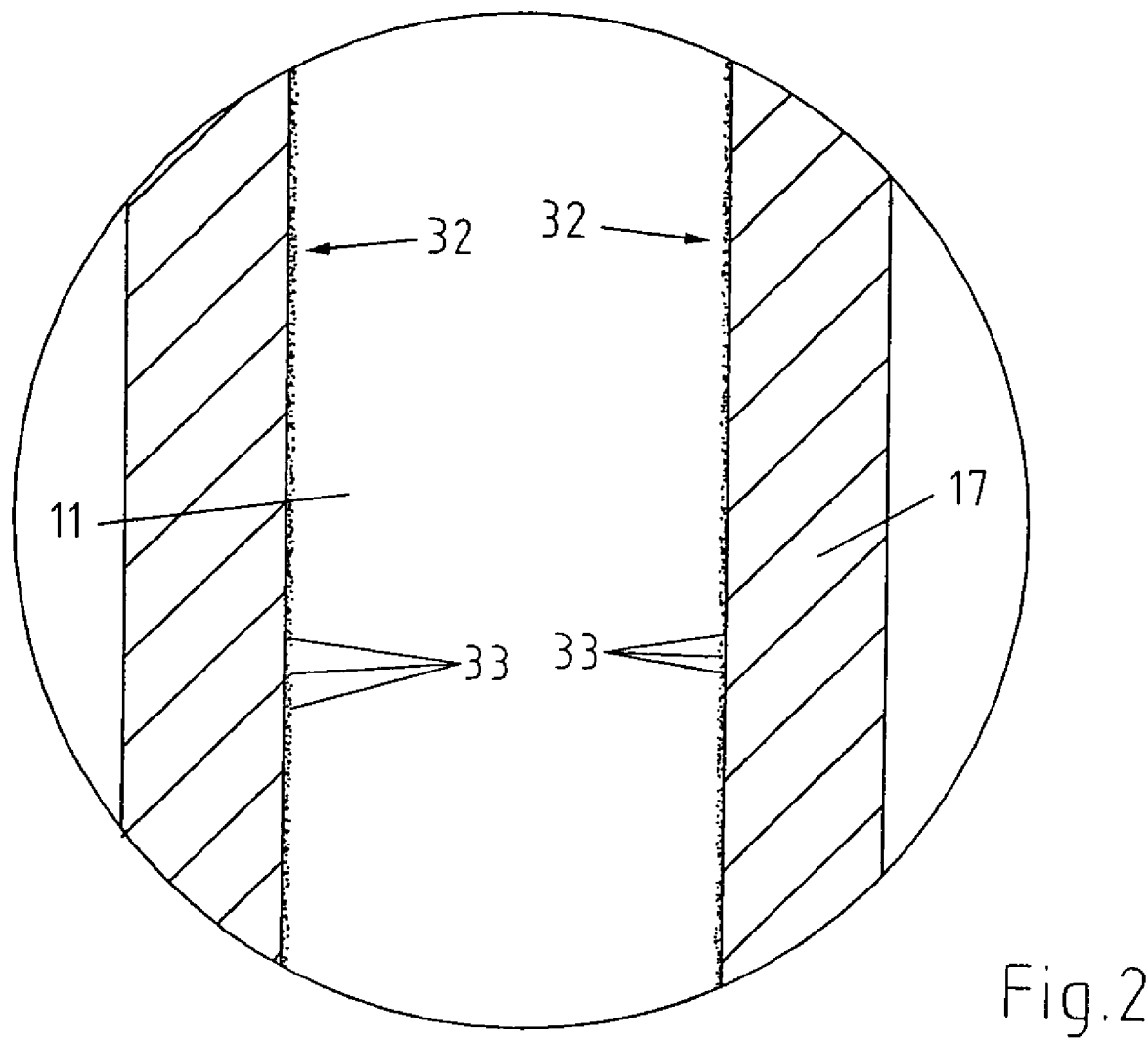
FIG. 2 shows a schematic view of an enlarged portion of the assembly of FIG. 1.

FIG. 2 shows an enlarged partial view of FIG. 1, in which the coating of the appendage 17 is shown in a schematical view that is not to scale. As can be seen, the wall of the milk supply channel 11 running in the interior of the appendage 17 is provided with a layer 32 consisting of a plurality of nano-particles 33. The nano-particles have a size in the region of $10^{-10}$ to $10^{-7}$ m, preferably approximately $10^{-8}$ m. It is understood that particles of this size can not be illustrated to scale. Insofar, this drawing shall show the layer and the particles only in a strictly schematic view. Instead of applying a layer of nano-particles, it is also possible to work-in the nano-particles into the surface of the particular component.

Application of the nano-particles can easily be done in a dipping bath, by spraying or by flooding. The relevant parameters can easily be determined by a person skilled in the art by simple tests.

Advantageously the composition to be used for such application comprises:
(a) a basic material forming nano-particles;
(b) a first additive having oleophobic properties;
(c) a second additive having hydrophobic properties; and
(d) silver or silver compounds.

Subsequently, the coated components are heated to 80 to 140° C., whereby the nano-coating polymerizes, cures, is tempered, and firmly unites with said component.

What is claimed is:

1. An assembly for creating milk froth and/or for heating milk, comprising:
   a foaming device including a steam supply channel, an air supply channel, a milk supply channel, and a discharge opening;
   a nozzle between said steam supply channel and said milk supply channel whereby steam is discharged from said steam supply channel into said milk supply channel; and
   a mixing channel between said milk supply channel and said discharge opening,
   wherein at least said milk supply channel and said mixing channel are provided with a surface layer which is both hydrophobic and oleophobic, said surface layer including nano-particles of silver or a silver compound.

2. An assembly according to claim 1, in which said hydrophobic and oleophobic surface layer is provided by hydrophobic and oleophobic nano-particles, which nano-particles, including said nano-particles of silver or a silver compound, are worked-in into the surface of said nozzle, said milk supply channel, said discharge opening and said mixing channel.

3. An assembly according to claim 1, in which said hydrophobic and oleophobic surface layer is provided by hydrophobic and oleophobic nano-particles, which nano-particles, including said nano-particles of silver or a silver compound, are applied to the surface of said nozzle, said milk supply channel, said discharge opening and said mixing channel in the form of a coating.

4. An assembly according to claim 1, in which said hydrophobic and oleophobic surface layer is provided by hydrophobic and oleophobic nano-particles, which nano-particles, including said nano-particles of silver or a silver compound, show a chemical or physical bond with said surface.

5. An assembly according to claim 1, further comprising a milk container communicating with said milk supply channel.

6. An assembly according to claim 5, further comprising means for attaching said foaming device to said milk container.

7. An assembly according to claim 5, in which said foaming device comprises an appendage extending towards the bottom of said milk container, said milk supply channel being located in said appendage and having, at its distal end, an inlet opening communicating with said milk supply channel.

8. An assembly according to claim 7, in which said appendage forms part of said milk supply channel and is provided with said surface layer.

9. An assembly according to claim 1, in which said foaming device comprises a first cylindrical recess, communicating with said steam supply channel.

10. An assembly according to claim 9, in which said foaming device comprises a second cylindrical recess, communicating with said discharge opening.

11. An assembly according to claim 10, in which said foaming device comprises a coupling element provided with two cylindrical stub members, said stub members being adapted to be inserted into said first and second cylindrical recesses, one of said stub members being connectable to a steam supply hose and the other of said stub members being connectable to a discharge hose.

12. An assembly according to claim 1, in which said foaming device comprises a venting channel, opening into said milk supply channel and communicating with the ambient air, which can be closed by means of a valve member.

13. An assembly according to claim 1, wherein at least said nozzle is also provided with said surface layer.

14. An assembly according to claim 1, wherein at least said discharge opening is also provided with said surface layer.

* * * * *